(12) United States Patent
Mayni

(10) Patent No.: US 9,656,436 B2
(45) Date of Patent: May 23, 2017

(54) METHOD AND TIRE FOR IMPROVED UNIFORMITY AND ENDURANCE OF AGGRESSIVE TREAD DESIGNS

(75) Inventor: Paul Andrew Mayni, Greenville, SC (US)

(73) Assignees: Compagnie Generale des Etablissements Michelin, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 545 days.

(21) Appl. No.: 14/131,991

(22) PCT Filed: Jul. 14, 2011

(86) PCT No.: PCT/US2011/044018
§ 371 (c)(1),
(2), (4) Date: Jan. 10, 2014

(87) PCT Pub. No.: WO2013/009315
PCT Pub. Date: Jan. 17, 2013

(65) Prior Publication Data
US 2014/0138874 A1 May 22, 2014

(51) Int. Cl.
*B29D 30/52* (2006.01)
*B29D 30/06* (2006.01)
(Continued)

(52) U.S. Cl.
CPC ......... *B29D 30/0681* (2013.01); *B29D 30/52* (2013.01); *B60C 11/03* (2013.01);
(Continued)

(58) Field of Classification Search
USPC ........................................... 264/284
See application file for complete search history.

(56) References Cited

U.S. PATENT DOCUMENTS 2,907,365 A * 10/1959 MacDonald ........ B60C 11/0309
152/209.6
3,464,874 A 9/1969 Ragan
(Continued)

FOREIGN PATENT DOCUMENTS

CN 1955021 5/2007
CN 101077632 11/2007
(Continued)

OTHER PUBLICATIONS

PCT International Search Report for PCT/US2011/044018, dated Dec. 16, 2011.
(Continued)

*Primary Examiner* — Jacob Thomas Minskey
(74) *Attorney, Agent, or Firm* — Dority & Manning, P.A.

(57) ABSTRACT

A tire having aggressive tread features with improvements in uniformity that can also improve endurance is provided along with a method and apparatus for manufacturing such a tire. The tire and its manner of manufacture can achieve a reduction or elimination of certain non-uniformities that can occur during the molding of large tread blocks. The reduction or removal of these non-uniformities can improve temperature performance to provide increased tire endurance.

9 Claims, 10 Drawing Sheets

(51) Int. Cl.
    *B60C 11/03*      (2006.01)
    *B60C 11/13*      (2006.01)
    *B60C 11/11*      (2006.01)
(52) U.S. Cl.
    CPC ........... *B60C 11/0311* (2013.04); *B60C 11/11* (2013.01); *B60C 11/1369* (2013.04); *B60C 11/1376* (2013.04)

(56) References Cited

U.S. PATENT DOCUMENTS

| | | | |
|---|---|---|---|
| 3,472,714 A | 10/1969 | Ragan | |
| 3,558,383 A | 1/1971 | Lejeune | |
| 3,703,423 A | 11/1972 | Wolfe | |
| 4,230,649 A * | 10/1980 | Bohm | B29D 30/54 156/129 |
| 6,371,179 B1 | 4/2002 | Tsuda | |
| 8,262,379 B2 | 9/2012 | Beaudonnet et al. | |
| 8,844,595 B2 | 9/2014 | Collette et al. | |
| 8,980,030 B2 | 3/2015 | Rey et al. | |
| 2010/0236695 A1 * | 9/2010 | Lamontia | B29D 30/52 156/123 |
| 2013/0087259 A1 | 4/2013 | Mancini | |
| 2013/0213539 A1 | 8/2013 | Christenbury et al. | |
| 2013/0213543 A1 | 8/2013 | Christenbury et al. | |
| 2013/0276945 A1 | 10/2013 | Colby et al. | |
| 2014/0318688 A1 | 10/2014 | Colby et al. | |

FOREIGN PATENT DOCUMENTS

| | | |
|---|---|---|
| GB | 1032746 | 6/1966 |
| GB | 1 205 951 | 9/1970 |
| GB | 1 252 431 | 11/1971 |
| JP | H 08142611 | 6/1996 |
| JP | 2001-179848 | 7/2001 |
| JP | 2004148601 | 5/2004 |
| WO | WO 2009/131578 | 10/2009 |
| WO | WO 2012/001544 | 1/2012 |

OTHER PUBLICATIONS

PCT International Search report for PCT/US2011/044013.
Extended European Search Report and Written Opinion, re: application No. 11869324.1, dated Sep. 9, 2015, 6 pages.

* cited by examiner

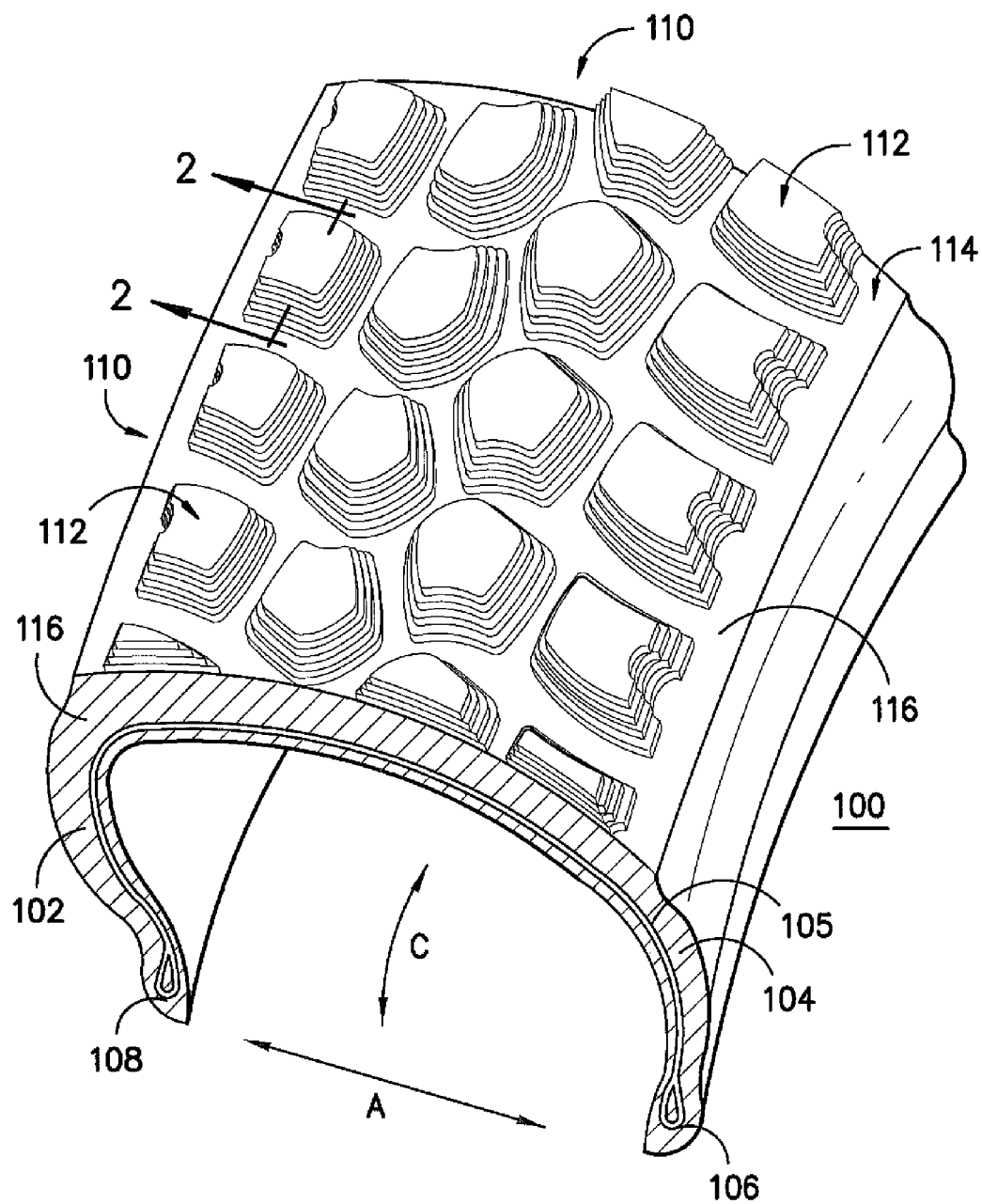
FIG. —1—

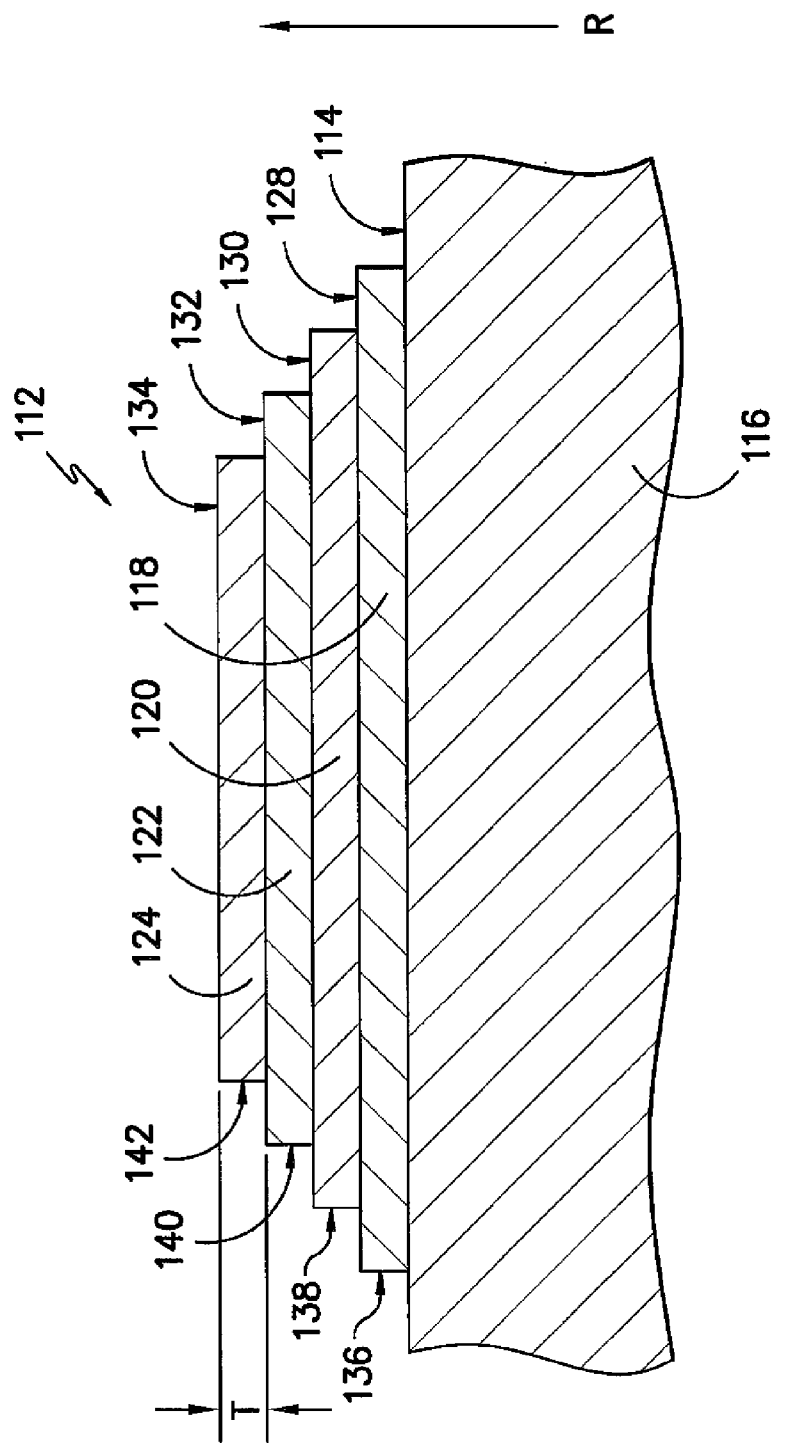
FIG. -2-

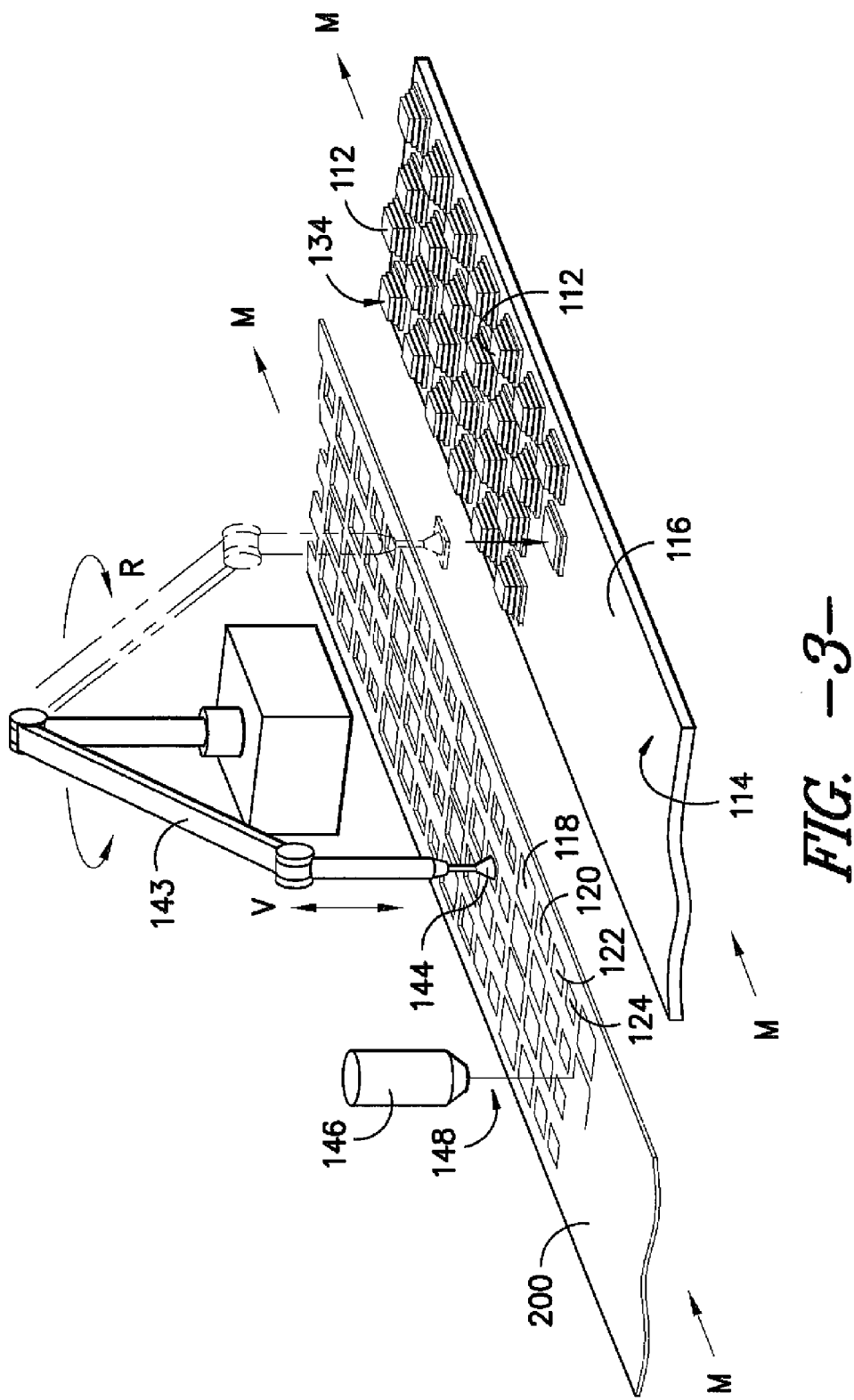
FIG. -3-

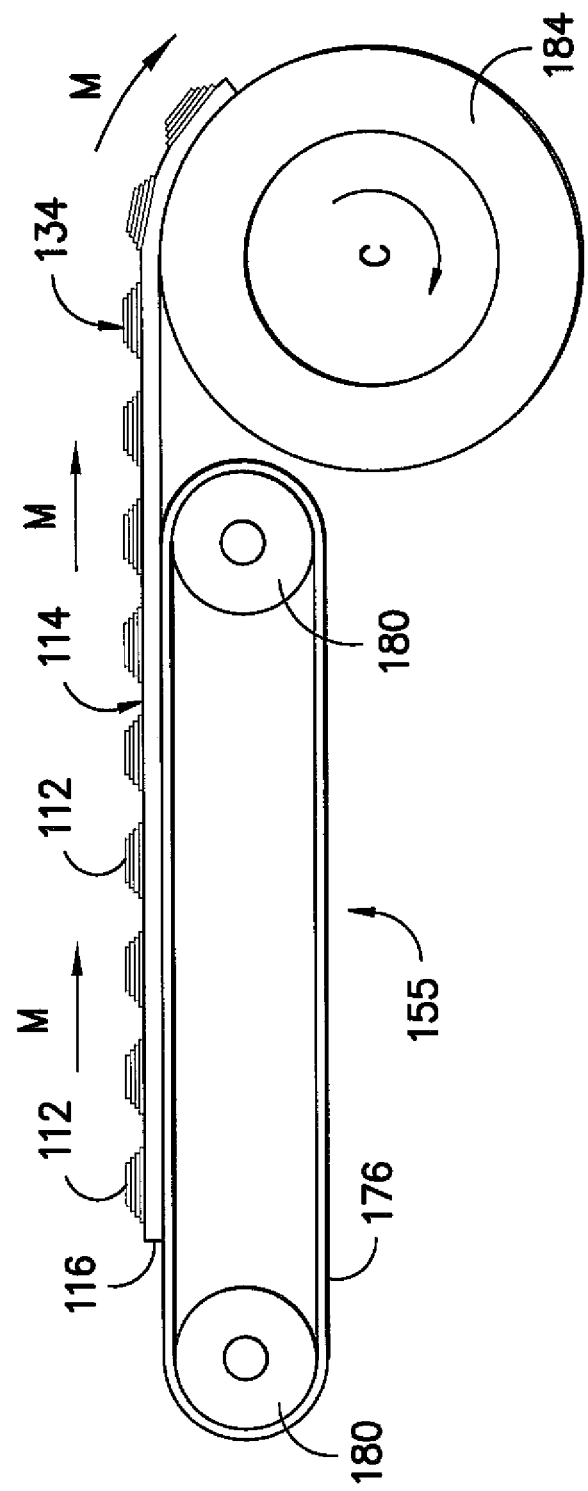
FIG. -4-

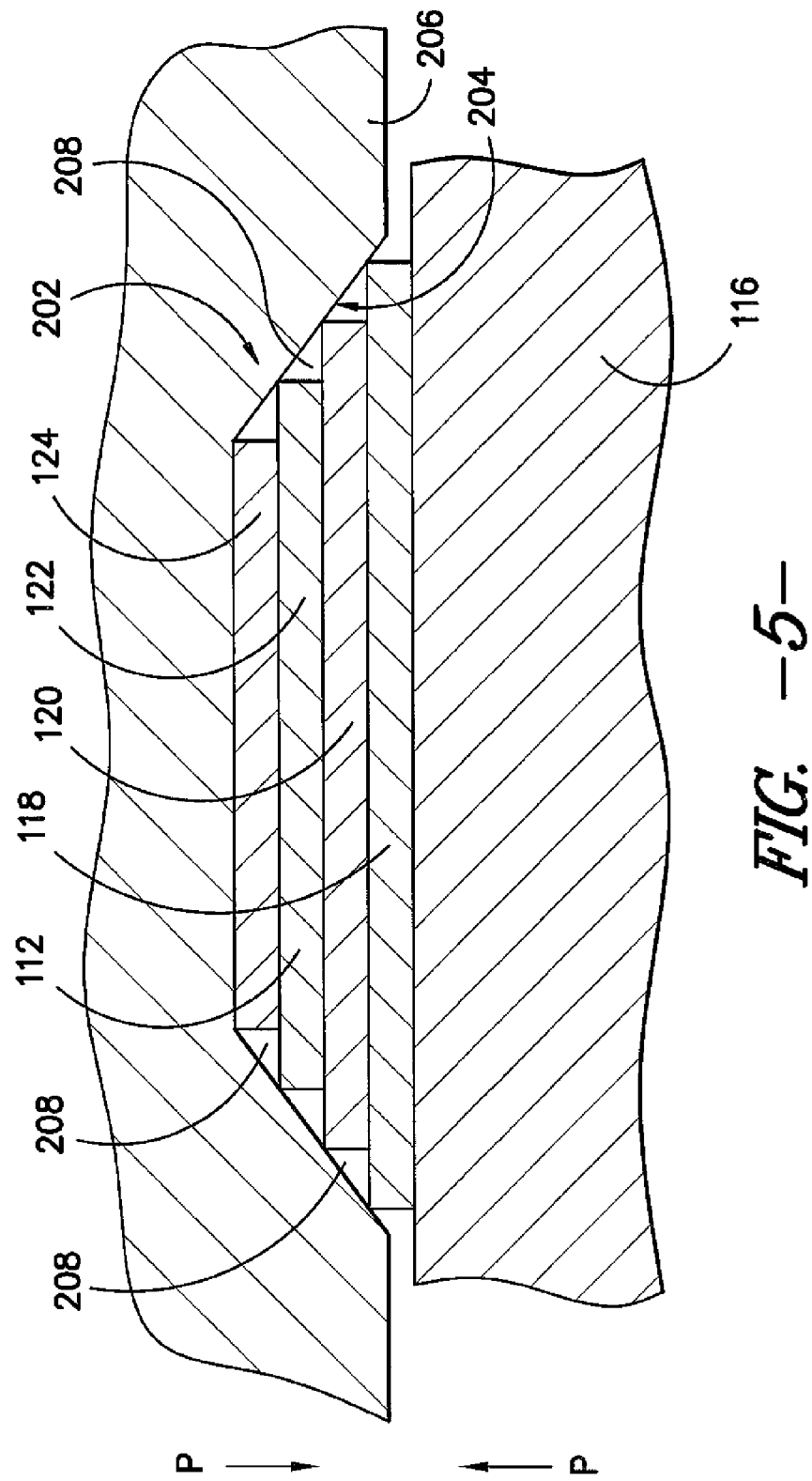

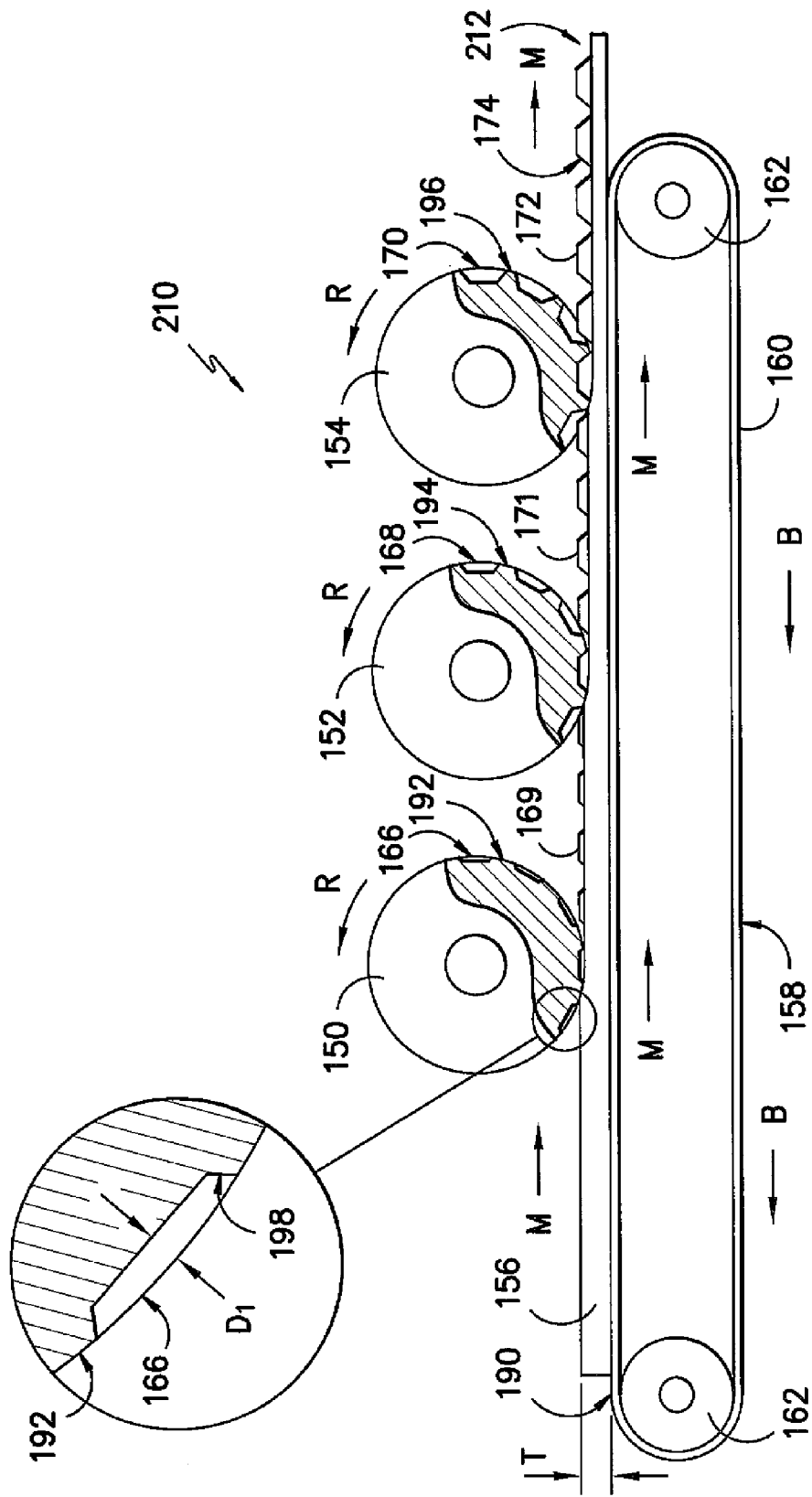
FIG. -6-

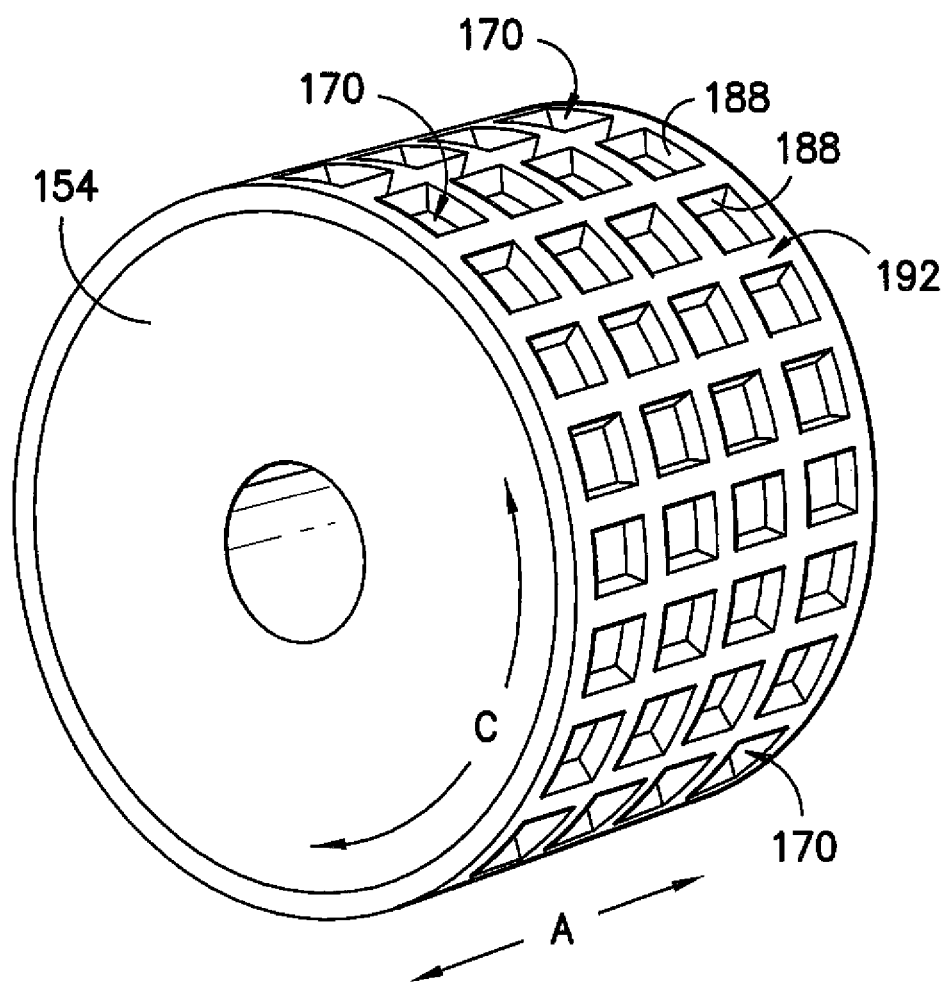
FIG. -7-

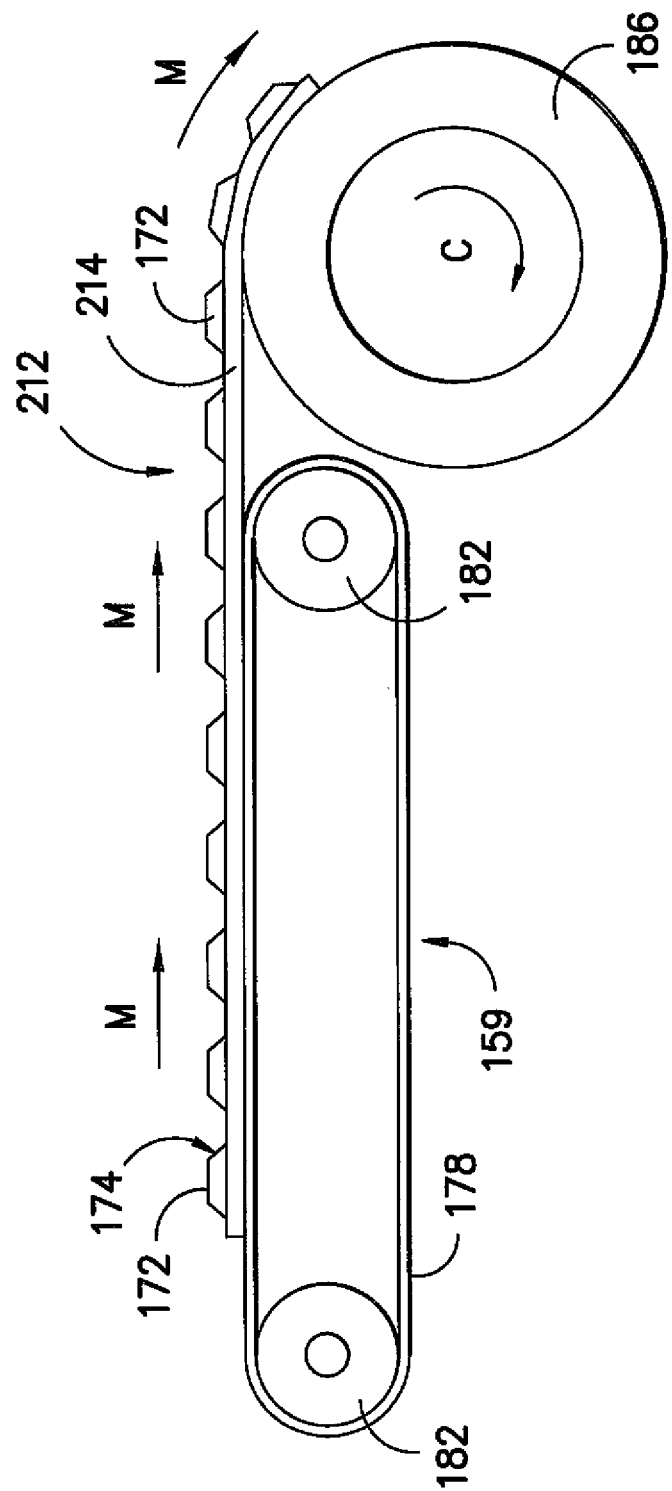
FIG. -8-

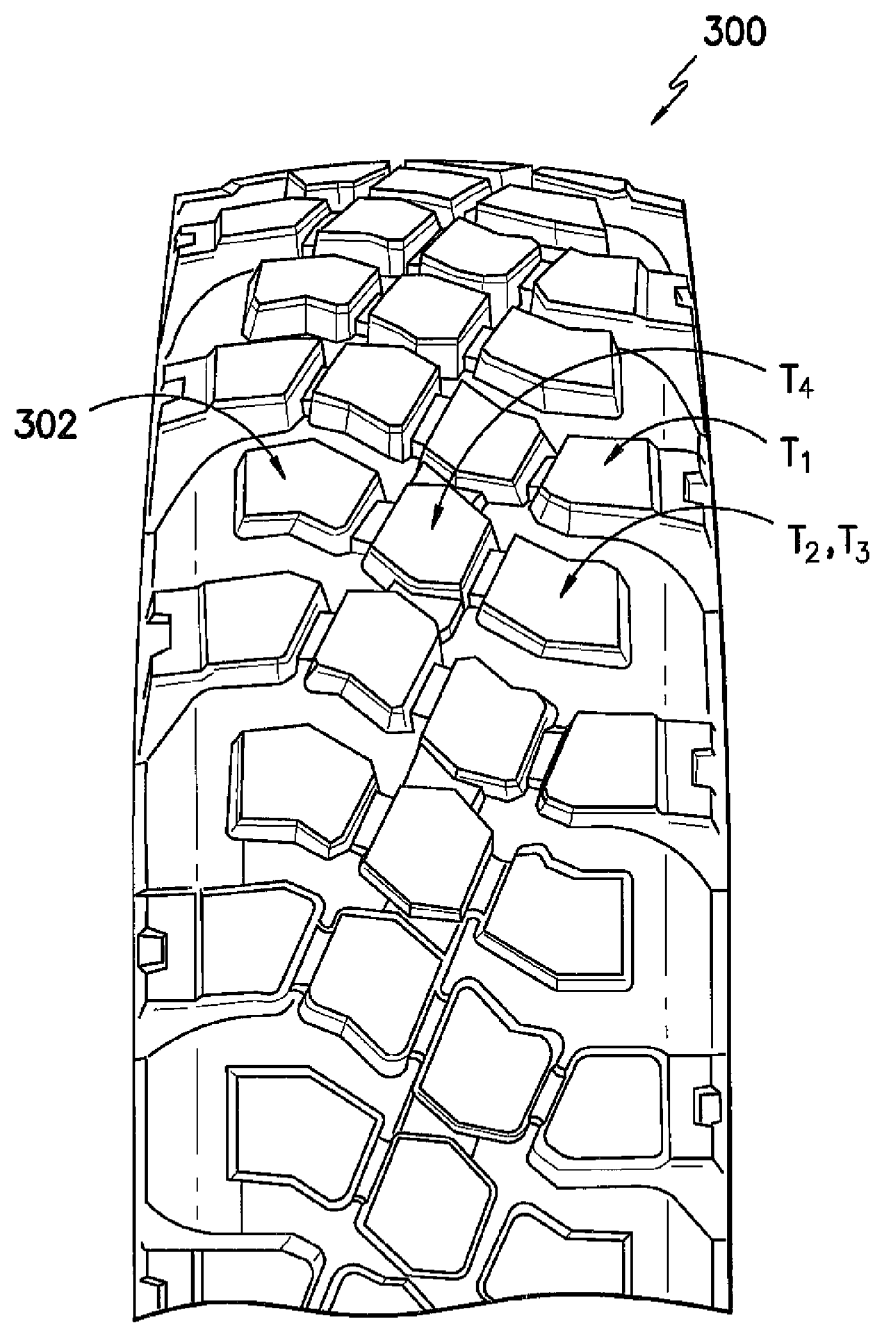
FIG. -9-

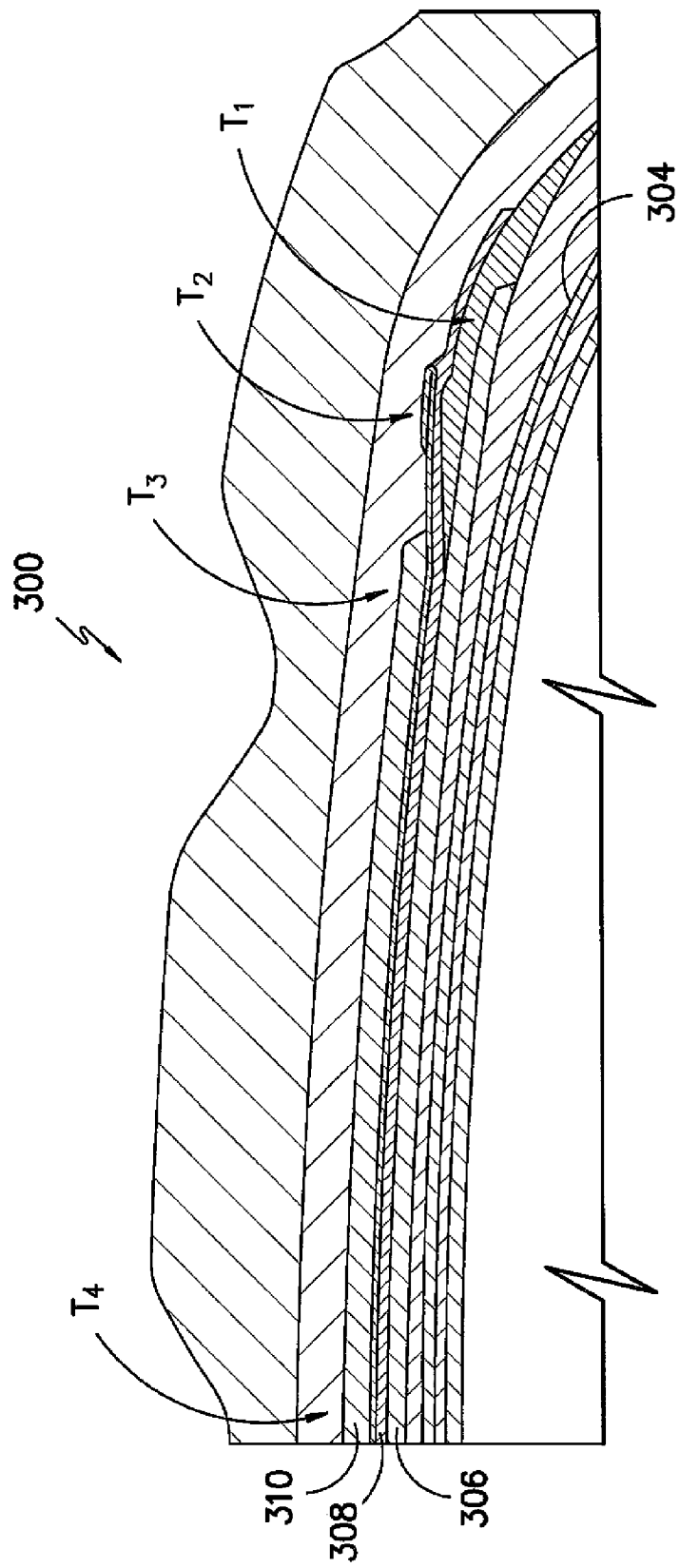
FIG. -10-

METHOD AND TIRE FOR IMPROVED UNIFORMITY AND ENDURANCE OF AGGRESSIVE TREAD DESIGNS

FIELD OF THE INVENTION

The present invention relates to a tire having an aggressive tread pattern and a method of manufacturing the same to improve uniformity and increase endurance.

BACKGROUND OF THE INVENTION

In general, tires are typically manufactured on a large scale through the build up of various layers onto a tire forming drum. The layers may include e.g., a carcass and other materials that provide the structure of the tire. The sides of these layers are turned up to create a toroid in the form of an uncured, tire intermediate. A layer or portion of tread rubber is then added to the tire intermediate to create what is sometimes referred to as a green tire. The green tire is subsequently cured by the addition of heat and pressure in a curing press.

The walls of the curing press typically include mold features for molding a tread design or tread pattern into the tread portion of the green tire. These mold features may provide e.g., tread blocks of various shapes and configurations with one or more grooves separating the tread blocks from each other. Various sipes or lamelles may be added into the tread blocks as well.

With aggressive tread designs, challenges to tire uniformity can be encountered in the conventional manufacturing process summarized above. As used herein, "aggressive" refers particularly to tread designs having deep (along the radial direction) and sometimes large tread blocks along the tread portion of the tire. Such designs can be commonly found, e.g., in military vehicle and off-road vehicle applications. In the manufacture of such tread designs, a large amount of the tread rubber from the tread portion of the green tire must be forced into mold features such as the cavities or apertures that create the tread blocks. Accordingly, a substantial amount of pressure is applied to displace this tread rubber and mold the tread features.

Unfortunately, this required displacement of the tread portion to form the tread blocks can also cause undesired displacement of one or more of the layers of the green tire that are located next to the tread portion. For example, the carcass and/or other layers can also be displaced to create local effects such as waves, bumps, undulations, or other undesirable irregularities that make the tire non-uniform along the circumferential and/or axial directions. Breaking belts can also be distorted the displacement of the tread portion. Such non-uniformity can create undesirable endurance problems for the tire by e.g., creating areas where unwanted temperature increases can occur during tire operation and thereby effecting tire endurance.

Accordingly, a tire that can be manufactured with an aggressive tread pattern in a manner that can reduce or eliminate certain non-uniformities would be useful. More particularly, such a tire that can be manufactured through a method that can help eliminate undesired displacements of various layers of the tire during the molding process would be beneficial. Such a tire and a method of manufacture that can provide improvements in endurance would also be beneficial.

SUMMARY OF THE INVENTION

Aspects and advantages of the invention will be set forth in part in the following description, or may be obvious from the description, or may be learned through practice of the invention.

In one exemplary embodiment of the present invention, a machine for manufacturing a tread portion having tread blocks is provided. The machine defines a machine direction and includes a conveying device for transporting a tread portion along the machine direction and a plurality of molding wheels suspended over the conveying device. Each molding wheel defines a plurality of apertures for the receipt therein of predetermined locations along the tread portion as the tread portion is conveyed past each molding wheel. The plurality of apertures each have a predetermined depth and shape. The predetermined depth of the plurality of apertures increases between the molding wheels along the machine direction. The apertures are configured for creating tread blocks having at least one sloped edge face.

In another exemplary aspect, the present invention provides a method for manufacturing a tread portion having tread blocks. The method includes the steps of applying a first pressure to the tread portion with a first molding surface that defines a plurality of apertures each having a depth D1 and each having at least one sloped wall for forming a sloped edge face on one of the tread blocks at a predetermined location on the tread portion. A second pressure is applied to the tread portion with a second molding surface that defines a plurality of apertures each having a depth D2 and each having at least one sloped wall for continuing to form a sloped edge face on one of the tread blocks at a predetermined location on the tread portion. Depth D2 is greater than depth D1.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective view of a portion of the toroid of an exemplary embodiment of a tire intermediate constructed according to the present invention.

FIG. 2 provides a cross section view, taken along line 2-2 in FIG. 1, of an exemplary embodiment of a tread block of the present invention.

FIG. 3 provides a perspective view of certain aspects of an exemplary method and apparatus of the present invention as may be used to manufacture a tread portion, an exemplary embodiment of which is also shown in process.

FIG. 4 provides a perspective view of certain aspects of an exemplary method and apparatus of the present invention as may be used to manufacture a tread portion, an exemplary embodiment of which is also shown being wrapped onto a tire intermediate.

FIG. 5 provides a partial cross-sectional view of an exemplary embodiment of a tread block inserted into an exemplary mold wall.

FIG. 6 provides a perspective view of certain aspects of an exemplary method and apparatus of the present invention as may be used to manufacture a tread portion, an exemplary embodiment of which is also shown in process.

FIG. 7 illustrates an exemplary embodiment of a molding wheel as may be used with the present invention.

FIG. 8 provides a perspective view of certain aspects of an exemplary method and apparatus of the present invention as may be used to manufacture a tread portion, an exemplary embodiment of which is also shown being wrapped onto a tire intermediate.

FIG. 9 is a partial front view of an exemplary tire of the present invention.

FIG. 10 is a partial cross-sectional view of the exemplary tire of FIG. 9.

The use of identical or similar reference numerals in different figures denotes identical or similar features.

DETAILED DESCRIPTION OF THE INVENTION

The present invention provides for a tire having aggressive tread features with improvements in uniformity that can also improve endurance. More particularly, the present invention provides a tire constructed by a method that can reduce or eliminate certain non-uniformities that can occur during the molding of large tread blocks. The reduction or removal of these non-uniformities can improve temperature performance to provide increased tire endurance. For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

As used herein, "tread rubber" refers to a variety of possible compositions—natural and synthetic—as may be used to construct various portions of a tire.

"Tire intermediate," as used herein, refers to a tire construction that may need additional processing steps before use such as curing and/or molding in a tire curing press.

FIG. 1 provides a perspective view of a portion of the toroid of an exemplary embodiment of a tire intermediate 100 constructed according to the present invention. Tire intermediate 100 includes a pair of sidewalls 102 and 104 opposed to each other along axial direction A. Bead portions 106 and 108 are located at the end of sidewalls 102 and 104. A tread portion 110 extends between sidewalls 102 and 104. A carcass layer 105 extends between bead portions 106 and 108 and under tread portion 110.

Tread portion 110 includes a tread pattern created by an arrangement of multiple tread blocks 112 spaced along axial direction A and circumferential direction C. The resulting tread pattern can be considered aggressive in that blocks 112 are relatively thick along radial direction R (FIG. 2) and are also relatively large in terms of the volume of tread rubber projecting above surface 114 that makes up each block 112. The particular tread pattern shown is by way of example only. The present invention may be used with a variety of other configurations or patterns of tread blocks. As shown in FIG. 2, the layers 118, 120, 122, and 124 of tread block 112 have substantially the same thickness T. However, using the teachings disclosed herein, it will be understood that variations in thickness T between layers may be used as well.

Referring now to FIGS. 1 and 2, each tread block 112 includes a plurality of layers of tread rubber 118, 120, 122, and 124. First layer 118 is positioned upon a base 116 that extends along circumferential direction C between sidewalls 102 and 104. While only four layers are shown, using the teachings disclosed herein it will be understood that fewer or more layers may be used to construct a tread block of the present invention and the embodiments shown in the figures are exemplary only. As shown, layers 118, 120, 122, and 124 are stacked along radial direction R and decrease successively in size moving outwardly (up from the reader's perspective in FIG. 2) along the radial direction R. For example, the width along axial direction A of layer 120 is less than such width for layer 118, and so forth for the other layers 122 and 124.

Stated alternatively, the layers 118, 120, 122, and 124 decrease in size along the radially outward direction R such that these layers are stepped as shown in FIG. 2. As a result, each layer has an edge face that surrounds a ground face. More particularly, first layer 118 has an edge face 136 that surrounds ground face 128; second layer 120 has an edge face 138 that surrounds ground face 130; third layer 122 has an edge face 140 that surrounds ground face 132; and fourth layer 124 has an edge face 142 that surrounds ground face 134. The surface area represented be each edge face decreases between successive edge faces along the radially outward direction. For example, the surface area of edge face 138 is less than the surface area of edge face 136.

FIG. 3 provides a perspective view of certain aspects of an exemplary method and apparatus of the present invention as may be used to manufacture tread portion 110. As shown, a sheet of tread rubber 200 is supplied along machine direction M for constructing layers that make up tread block 112. A cutting device such as a water jet cutter 146 provides a stream 148 of water under high pressure that is directed towards sheet 200. An x-y machine (not shown) or other control device moves cutter 146 to cut sheet 200 into individual portions that each form one of layers 118, 120, 122, or 124 making up tread block 112. As sheet 200 is advanced along machine direction M, a robotic arm 143 with a suction element 144 or other selection device then individually selects the portions making up layers 118, 120, 122, or 124 and sequentially positions each layer onto base 116 (as indicated by arrows V and R and the phantom representation of arm 143). A controller (not shown) operates robotic arm 143 to position each layer at predetermined locations on base 116 and to stack the layers (smaller layers on top of the larger layers) to create tread blocks 112. For this exemplary method, base 116 is also conveyed along machine direction M in a manner parallel to the movement of sheet 200.

Turning to FIG. 4, after each tread block 112 has been constructed, tread portion 110 is advanced along machine direction M by, for example, a conveying device 155 having an endless belt 176 carried on rollers 180. Tread portion 110 (including base 116 and tread blocks 112) is fed to an untreaded tire intermediate 184 and wrapped around intermediate 184 as shown by arrow C in FIG. 4. The resulting tire intermediate 110 can then be e.g., placed into a curing press for the application of heat and pressure.

After such curing, it should be understood that the stepping of individual layers 118, 120, 122, and 124 as shown in FIGS. 1 through 4 may no longer be plainly visible. FIG. 5 illustrates a cross-section of an aperture or cavity 202 defined by a wall 204 of a mold 206 as can be part of a curing press. As tread block 112 is pressed into mold 206 (arrows P), layers 118, 120, 122, and 124 initially contact wall 204 only tangentially at the intersections of the edge face and ground face of such layers. As heat and pressure are applied by the mold, layers 118, 120, 122, and 124 assume the shape provided by mold wall 204. In addition, first layer 118 provides additional tread rubber that helps fill voids 208. By carefully predetermining the volume of each of layers 118, 120, 122, and 124, the volume of tread rubber making up the final, cured tread block 112 is substantially the same as the total volume of tread rubber provided by layers 118, 120, 122, and 124. As a consequence, the additional tread rubber needed to fill voids 208 does not come from base 116, which might cause non-uniformities such as e.g., a local displacement of carcass 105 (FIG. 1) and/or breaking belts located radially outward of the carcass in the crown region of the tire. Instead, substantially all of the tread rubber is provided by layers 118, 120, 122, and 124 to avoid local effects that lead to non-uniformities.

FIG. 6 provides a perspective view of certain aspects of an exemplary method and molding apparatus 210 of the present invention as may be used to manufacture an exemplary uncured tread portion 212, which is shown in process. Apparatus 210 includes a conveying device 158 for transporting unmolded tread portion 156 along machine direction M. Conveying device 158 includes endless belt 160 carried upon rollers 162 and returning belt 160 along direction B. A plurality of molding wheels 150, 152, and 154 are suspended over conveying device 156. More particularly, first molding wheel 150, second molding wheel 152, and third molding wheel 154 are each suspended over conveying device 155 at heights that are each less than the overall thickness T of unmolded tread portion 156. As unmolded tread portion 156 is advanced along machine direction M, each molding wheel rotates as shown by arrows R and tread portion 156 is squeezed between the molding wheels 150, 152, 154 and conveying device 158.

First molding wheel 150 includes a plurality of apertures 166 positioned over a first molding surface 192. Similarly, second molding wheel 152 includes a plurality of apertures 168 positioned over second molding surface 194. Third molding wheel 154 has a plurality of apertures 170 positioned over third molding surface 196. By way of example, FIG. 7 provides a close-up of third molding wheel 154. Along the circumferential directions C and axial directions A, third molding wheel 154 includes a plurality of apertures 170 for molding tread portion 156. Each aperture 170 includes sloped walls 188 for shaping uncured tread portion 156. Each aperture 170 has a particular shape and predetermined location as desired for creating a tread pattern and shaping tread blocks on tread portion 156. The configuration shown in FIG. 7 is by way of example only and others may be used as well.

Referring again to FIG. 6, the apertures of each molding wheel 150, 152, 154 are provided at predetermined depths that increase from wheel to wheel along machine direction M. For example, first molding wheel 150 includes apertures 166 at a depth D1 with sloped surfaces 198. Similarly, second molding wheel 152 includes apertures 168 having a depth D2, and third molding wheel 154 has apertures as depth D3. The depths increase along the machine direction such that D3>D2 and D2>D1.

Accordingly, as the uncured tread portion 156 is advanced along machine direction M by conveying device 158, first molding surface 192 applies a first pressure to tread portion 156 that creates an intermediate tread block 169—i.e. a precursor to the shape of the final tread block 172. As portion 156 is further advanced along machine direction M, second molding surface 194 applies a second pressure to tread block 169 to create intermediate tread block 171. Finally, as portion 156 is advanced under third molding wheel 154, third molding surface 196 applies a third molding pressure to tread portion 156 to create tread block 172 from intermediate tread block 171. Tread block 172 has a sloped edge face 174 and is part of the final tread portion 212.

In succession, each molding surface 192, 194, and 196 forces additional tread rubber from portion 156 into the apertures so as form tread block 172. Molding surfaces 192, 194, and 196 are positioned successively closer to the transporting surface 190 of conveying device 158 by either lowering wheels 150, 152, and 154 in succession relative to each other or increasing the wheel diameter from wheel to wheel along the machine direction M. The relative position of the apertures on each of the molding wheels 150, 152, and 154 are the same from wheel to wheel and the rotation R of the wheels are synchronized to properly position the application of the molding pressure from wheel to wheel in creation of the tread blocks.

Turning to FIG. 8, after each tread block 172 has been constructed, tread portion 212 is advanced along machine direction M by, for example, a conveying device 159 having an endless belt 178 carried on rollers 182. Tread portion 212 is fed to an untreaded tire intermediate 186 and wrapped around intermediate 186 as shown by arrow C in FIG. 8. The resulting tire intermediate 186 can then be e.g., placed into a curing press for the application of heat and pressure. In addition, because tread blocks 172 were formed in whole or in part before additional molding and curing in a curing press, rubber to create tread blocks 172 is already provided rather than drawing such rubber from base 214 by application of heat and pressure. Again, such a construction and process helps avoid or eliminate non-uniformities that might result when layers of the tire intermediate 186 that are positioned radially-inward of base 214 shift or move as rubber is drawn from base 214.

FIG. 9 provides another example of a tire 300 having aggressive tread blocks 302. A cross-section of tire 300 is shown in FIG. 10. Tire 300 includes a carcass 304, first belt 304, second belt 308, and third belt 310. Table 1 provide the results of an evaluation of the differences in temperature that can be achieved when tread features such as aggressive tread blocks 302 are provided through conventional tire molding and curing as compared with creating such features before the traditional curing step.

TABLE I

| Location | Temp ° C. Conventional Mfg. | Temp ° C. Blocks formed Pre-Cure | Δ ° C. |
|---|---|---|---|
| $T_1$ | 117.5 | 108.5 | −9.25 |
| $T_2$ | 117 | 98.25 | −18.75 |
| $T_3$ | 107.25 | 96.75 | −10.5 |
| $T_4$ | 99 | 100 | 1 |

Each row represents a temperature as determined in different positions $T_1$, $T_2$, $T_3$, and $T_4$ of the crown of a conventionally manufactured tire 300 versus a tire 300 having aggressive tread blocks created before the tire curing process. As shown in Table 1, substantial reductions in temperature can be achieved at certain locations. These reductions can substantially improve the endurance of the tire. Additionally, the data suggest that substantial temperature improvements are more likely to occur near the lateral edges of the belts 304, 308, and 310, which is likely because the edge of a belt can be more readily displaced during a conventional molding process as rubber located above (radially-outward of) the belt is displaced into a mold cavity.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A machine for manufacturing a tread portion having tread blocks, the machine defining a machine direction, the machine comprising:
    a conveying device for transporting a tread portion along the machine direction; and
    a plurality of molding wheels suspended over said conveying device in a sequential manner along the machine direction, each said molding wheel defining a plurality of apertures for the receipt therein of predetermined locations along the tread portion as the tread portion is conveyed past each said molding wheel, said plurality of apertures having a predetermined depth and shape, the predetermined depth of the plurality of apertures increasing between said molding wheels along the machine direction and each aperture configured with a plurality of walls that surround rubber in the tread portion to create tread blocks having at least one sloped edge face.

2. A machine for manufacturing a tread portion having tread blocks as in claim 1, wherein the plurality of walls of each of said apertures includes at least one sloped wall for creating the at least one sloped edge face of the tread blocks.

3. A machine for manufacturing a tread portion having tread blocks as in claim 2, wherein plurality of molding wheels comprises
    a first molding wheel including a plurality of apertures, wherein each aperture has a depth into the molding wheel of D1;
    a second molding wheel including a plurality of apertures, wherein each aperture has a depth into the molding wheel of D2; and
    a third molding wheel including a plurality of apertures, wherein each aperture has a depth into the molding wheel of D3;
    wherein depth D3 is greater than depth D2, and depth D2 is greater than depth D1, and wherein the second molding wheel is after the first molding wheel along the machine direction, and the third molding wheel is after the second molding wheel along the machine direction.

4. A machine for manufacturing a tread portion having tread blocks as in claim 3, wherein said molding wheels are suspended over a transport surface of the conveying device at heights that are less than the overall thickness of the tread portion.

5. A method for manufacturing a tread portion having tread blocks, the method comprising the steps of:
    applying a first pressure to the tread portion with a first molding surface that defines a plurality of apertures each having a depth D1, each aperture of the first molding surface defined by a plurality of walls that surround rubber in the tread portion to create the tread blocks, and each aperture of the first molding surface having at least one sloped wall for forming a sloped edge face on one of the tread blocks at a predetermined location on the tread portion; and,
    applying a second pressure to the tread portion with a second molding surface that defines a plurality of apertures each having a depth D2, each aperture of the second molding surface defined by a plurality of walls that surround rubber in the tread portion to create the tread blocks, and each aperture of the second molding surface having at least one sloped wall for continuing to form the sloped edge face on one of the tread blocks at a predetermined location on the tread portion;
    wherein depth D2 is greater than depth D1, and wherein the step of applying a second pressure occurs after the step of applying a first pressure.

6. A method for manufacturing a tread portion having tread blocks as in claim 5, further comprising the steps of:
    applying a third pressure to the tread portion with a third molding surface that defines a plurality of apertures having a depth D3, each aperture of the third molding surface defined by a plurality of walls that surround rubber in the tread portion to create the tread blocks, and each aperture of the third molding surface having at least one sloped wall for continuing to form the sloped edge face on one of the tread blocks at a predetermined location on the tread portion;
    wherein depth D3 is greater than depth D2.

7. A method for manufacturing a tread portion having tread blocks as in claim 6, further comprising the steps of conveying the tread portion past the first and second molding surfaces during said step of applying a first pressure and said step of applying a second pressure.

8. A machine for manufacturing a tread portion having tread blocks as in claim 1, wherein all the walls of each aperture of said first and second molding surfaces are sloped so as form multiple sloped edge faces on one of the tread blocks at a predetermined location on the tread portion.

9. A machine for manufacturing a tread portion having tread blocks as in claim 1, wherein the plurality of walls connect with each other to surround the aperture.

* * * * *